United States Patent [19]

de Bennetot

[11] Patent Number: 4,486,638

[45] Date of Patent: Dec. 4, 1984

[54] DEVICE FOR CONVERTING ROTATIONAL KINETIC ENERGY TO HEAT BY GENERATING EDDY CURRENTS

[75] Inventor: Michel C. de Bennetot, Brest, France

[73] Assignee: La Material Magnetique, France

[21] Appl. No.: 434,148

[22] Filed: Oct. 13, 1982

[30] Foreign Application Priority Data

Oct. 16, 1981 [FR] France .................. 81 19468

[51] Int. Cl.³ .............................................. H05B 6/10
[52] U.S. Cl. ......................... 219/10.51; 219/10.49 R; 219/10.75; 219/10.79; 290/44; 290/55
[58] Field of Search ............... 219/10.51, 10.49 R, 219/10.65, 10.57, 10.75, 10.77, 10.79; 290/44, 55

[56] References Cited

U.S. PATENT DOCUMENTS

| | | | |
|---|---|---|---|
| 3,517,151 | 6/1970 | Mekjean | 219/10.51 X |
| 4,217,475 | 8/1980 | Hagerty | 219/10.51 |
| 4,311,896 | 1/1982 | Junya | 219/10.75 X |
| 4,350,861 | 9/1982 | Pouillange et al. | 219/10.49 R X |
| 4,421,967 | 12/1983 | Birgel et al. | 219/10.51 |

*Primary Examiner*—P. H. Leung
*Attorney, Agent, or Firm*—William A. Drucker

[57] ABSTRACT

The converter device comprises a magnetic rotor (2) rotatively mounted integral with primary shaft (1) of the device and a heat exchanger (5) having electrically conducting walls through the helically-shaped inner cavity (6) of which a fluid is caused to flow and within the walls of which rotating induction produced by a rotor generates eddy currents. A tachometer generator (8) measures the shaft rotational speed and controls, as a function of the said speed, the angular position of an electric motor (9), which drives the exchanger (5) along a linear translation path in a direction parallel to the rotor axis. Due to such a closed-loop control, the resistant torque is governed by a predetermined relation. The device can be used to convert to heat rotational kinetic energy from a wind turbine.

5 Claims, 8 Drawing Figures

DEVICE FOR CONVERTING ROTATIONAL KINETIC ENERGY TO HEAT BY GENERATING EDDY CURRENTS

BACKGROUND OF THE INVENTION

The invention relates to a device converting to heat mechanical energy picked up from a rotating shaft.

In practical uses of thermal degradation of mechanical energy a number of requirements must be simultaneously met so that such an operation is effected with a good efficiency. In particular, if a device for converting rotational kinetic energy to heat does not operate with constant speed, it must be matched to the characteristics of the machine which drives the primary shaft.

In an important use of the invention where said machine will be a wind turbine the power amount picked up thereby will vary as the cube value of the wind speed, under optimum efficiency conditions which are characterized by an operation at a constant specific speed, which is equal to the ratio from the rotor peripheral speed to the wind speed. It results therefrom that the energy converter should ideally dissipate a power amount proportional to the cube of the shaft rotational speed and accordingly, have a resistant torque proportional to the square of said rotational speed.

THE PRIOR ART

Now, the conventional-type electrical generators which are frequently used as energy converters do not have a torque varying as the square of their rotational speed. Thus, in an attempt to overcome this drawback, generators including a plurality of windings have previously been devised.

Other devices have also previously been used to obtain a torque variation law of the desired kind: these are, among others, hydraulic circuits wherein a propeller driven by the primary shaft heats up a fluid or pumps associated with pressure drop ports; finally, devices operating with dry frictional forces have also been developed.

All the above devices are substantially difficult to be operated and have drawbacks.

OBJECT OF THE INVENTION

The object of the invention is to provide a device for converting rotational kinetic energy to heat which will be free of the drawbacks of the prior devices, highly reliable and by which the resistant torque characterizing the device can be given a value varying according to a predetermined law, e.g. as the square of the speed of the driving shaft.

SUMMARY OF THE INVENTION

The converter in accordance with the invention consists essentially of a multipolar rotor having permanent magnets, of a stator having an electrically conducting wall subjected to the magnetic induction generated by the rotation of the permanent magnets and thus producing a resistant couple by generation of eddy currents, and a heat exchanger, wherein said heat-carrying fluid circuit is formed within the stator by said electrically conducting wall.

BRIEF DESCRIPTION OF THE DRAWINGS

Other features as well as the advantages of the invention will become clearly apparent from the following description.

In the accompanying drawings.

DESCRIPTION OF THE PREFERRED EMBODIMENT

Figure 1:
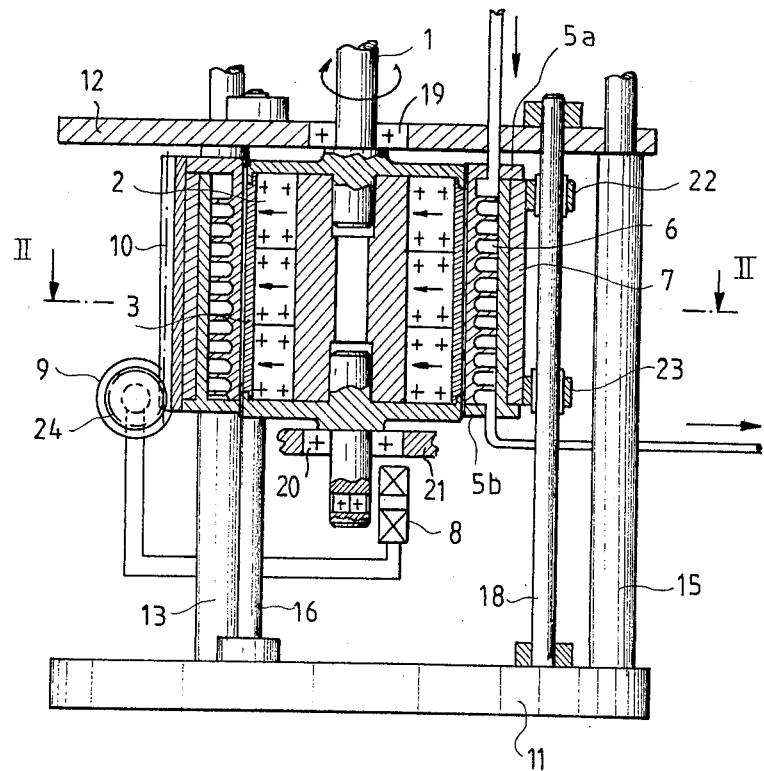
FIG. 1 shows a partially sectional view along line I.I of FIG. 2 of a device in accordance with a preferred embodiment of the invention, in the position where the resistant torque generated thereby has its maximum value.

The illustrated device includes a rotor mechanically connected to primary drive shaft 1. The latter may be, e.g. the output shaft of a speed multiplier the input shaft of which is the shaft of a wind turbine having a vertically extending axis. The primary shaft is thus rotated, e.g. at 900 r.p.m.

The rotor consists of a plurality of radially extending permanent magnets 2 the outer polar faces thereof are covered with soft steel members 3. The rotor advantageously consists of said members and a coating 4 of a moldable material so as to have a smooth cylindrical outer surface. Whenever it rotates, it generates a magnetic induction sweeping the space surrounding it and is thus able to generate eddy currents in such a space, within members made of a low resistivity material. Such a property is used to generate in the very walls of a heat exchanger through which a fluid is caused to flow, heat energy which will increase temperature of said fluid. Said heat exchanger consists, in the illustrated embodiment, of a cylindrical casing or shell 5 made from a material having a low electrical resistivity (e.g. copper or light alloy) in which there is provided a helical conduit 6 so that the flowing fluid contacts, along a relatively extended path, hot walls, the temperature of which is related to the strength of the Joule effect produced by the above specified eddy currents. Said fluid which may be e.g. water, will heat up within a period of about one minute from a temperature of e.g. about 15° C. to a temperature between 50° and 70° C. The fluid flow may be continuous.

The shell 5 may advantageously be made of two coaxial sections one of which, 5a, comprises the cylindrical inner wall of the exchanger and the upper annular wall thereof and the other of which, 5b, comprises the cylindrical outer wall of the exchanger and the lower annular wall thereof. A magnetic yoke 7 made of soft steel is advantageously disposed about the exchanger cylindrical shell so as to prevent any scattering of the magnetic field and thus increase its strength in the exchanger zone. Said yoke may be rotated, if desired. In as much as it is not being rotated, as in the illustrated embodiment, eddy currents generated by the rotor rotating induction are also produced there, but are much lower than those which are produced in the exchanger walls due to the fact that soft steel resistivity is much higher than resistivity of the material used to make the exchanger walls. Furthermore, the heating up of the yoke resulting from its contact with the exchanger helps to heat up the fluid and thus does not cause any loss of efficiency for the apparatus. The device is arranged between a base 11 and a top plate 12 interconnected by three columns 13, 14, 15 and three guide rods 16, 17, 18.

The rotor is supported on a pair of bearings 19 and 20 which are mounted in plate 12 and another stationary supporting plate 21 respectively.

The exchanger-yoke integral assembly is slidably mounted on rods 16, 17, 18 through ball sockets such as 22, 23.

Movement of said assembly in either direction along said guide rods is caused by a gear 24 which cooperates with a rack 10 secured to yoke 7 along an outer generatrix thereof.

Figure 2:
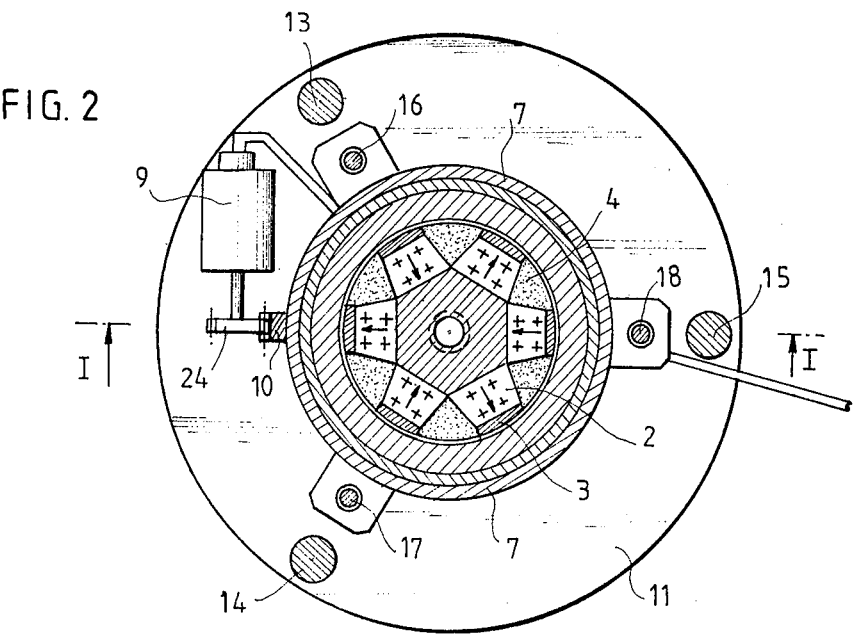
FIG. 2 shows a partially sectional view of the device along line II.II of FIG. 1.
Figure 3:
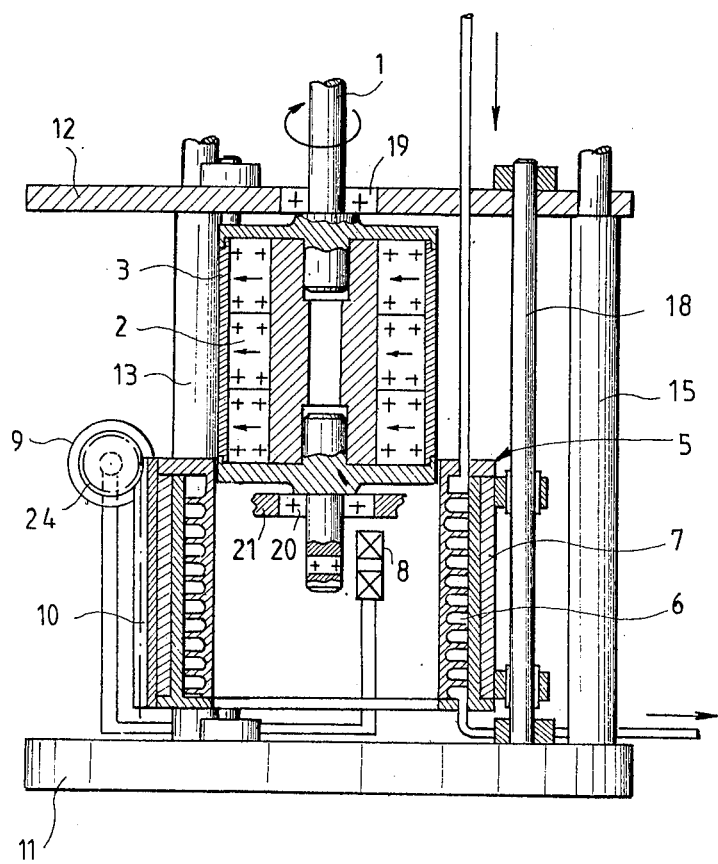
FIG. 3 is a view similar to FIG. 1 but showing the device in the position where the generated torque has its minimum value and is practically near zero.

In the position as shown in FIGS. 1 and 2, the exchanger-yoke assembly completely surrounds the rotor and is thus exposed to the whole rotating induction generated thereby. On the other hand, in the position as shown in FIG. 3, it can be seen that the exchanger yoke assembly is substantially entirely located outside from the zone in which the magnetic rotor is located. Under such conditions, it should be obvious that the eddy currents generated in the exchanger will be quite small and even substantially null; it will be the same for the resistant torque applied to the primary shaft.

Figure 4:
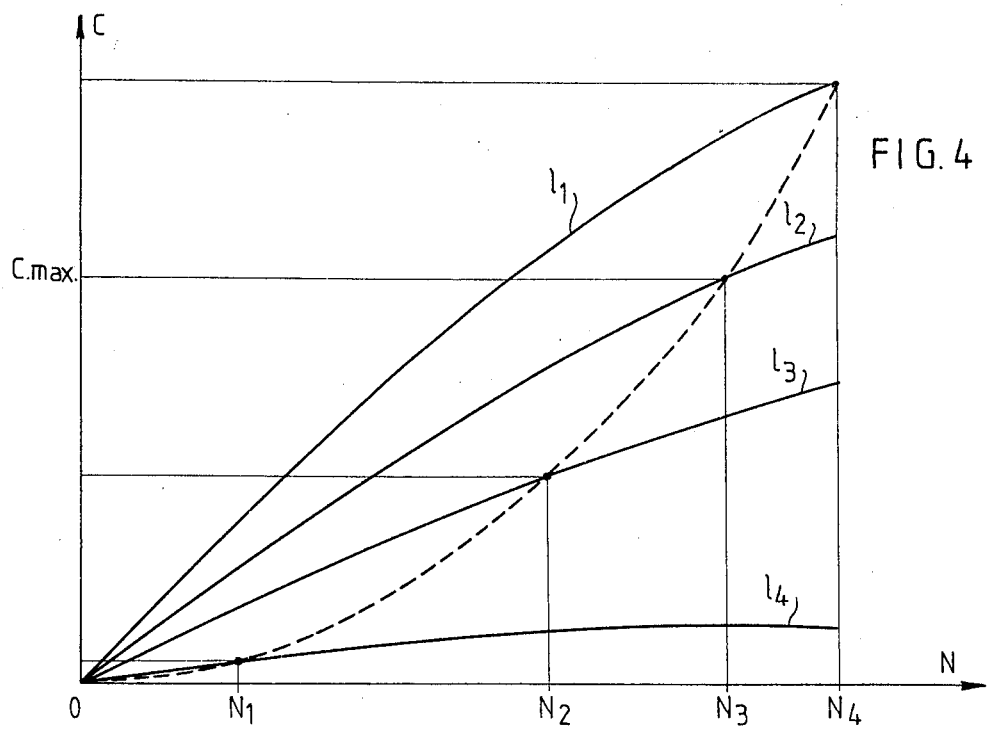
FIG. 4 illustrates variation of the resistant torque of the apparatus as a function of the rotational speed and of the relative position of the component part thereof.
Figure 5:
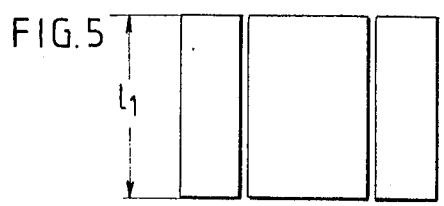
FIG. 5 illustrates a limit position, in which the rotor is completely surrounded by the stator, the cylindrical opposite surfaces of flux transfer thereof having a height $l_1$.
Figure 7:
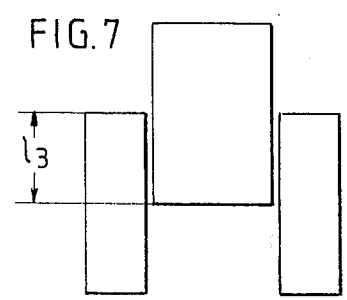
FIG. 7 illustrates a second intermediate position, in which the opposite surfaces of flux transfer have a a height $l_3$
Figure 6:
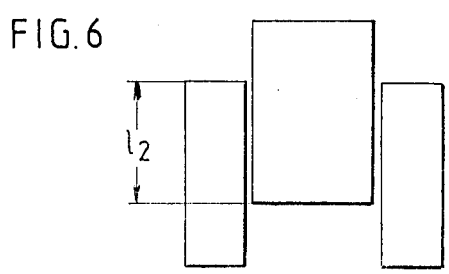
FIG. 6 illustrates a first intermediate position, in which the opposite surfaces of flux transfer have a height $l_2$.
Figure 8:
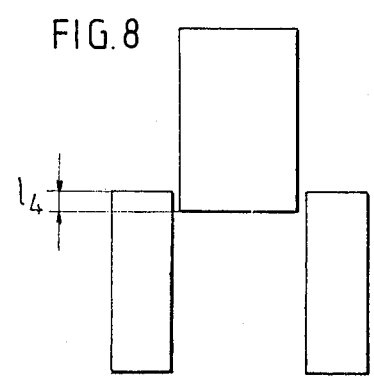
FIG. 8 illustrates a third intermediate position in which the opposite surfaces of flux transfer have a height $l_4$.

In FIG. 4, said resistant torque C is shown as a function of the rotational speed in revolutions per minute. Plot $l_1$ corresponds to that relative position of the exchanger yoke-assembly and the rotor which is diagrammatically illustrated in FIG. 5; plot $l_2$ corresponds to that position which is diagrammatically illustrated in FIG. 6; plot $l_3$ corresponds to the position diagrammatically illustrated in FIG. 7 and plot $l_4$ corresponds to the position diagrammatically illustrated in FIG. 8.

By displacing the exchanger-yoke assembly with respect to the rotor in a direction parallel thereto there is obtained for each relative position a torque value between zero and the maximum value $C_{max}$ corresponding to FIG. 1. The rotor speed is measured by a tachometer device 8 which provides information for controlling a gear driving means including an electric motor 9. The position of the exchanger-yoke assembly is thus made dependent on the rotational speed of the primary shaft, the interdependance law or relation as programmed in the drive means being such that the resistant torque applied to the primary shaft will vary between zero and the maximum value according to a predefined plot; e.g. it will vary as the square of the rotational speed, i.e. it will have a parabolic shape (see the dotted line in FIG. 4).

In order to minimize thermal losses, it may be advantageous to provide the apparatus with heat insulation or more generally to use a device acting as a heat insulator arranged about the device and owing to which the heat energy generated by the eddy currents is most efficiently used for heating up the fluid flowing through the exchanger.

The just-described arrangement is of the cylindrical type with rotational symmetry. Clearly, other arrangements can be considered. The magnetic rotor, instead of having radially extending poles, could be made such that it will generate an induction directed parallel to its axis and it would be closeable by a coaxial circular planar member slightly spaced from the ends thereof. Between the rotor and said member, there could be disposed an exchanger through which water would flow between the two planes defined thereby.

One also may contemplate an arrangement in which the relative positions of the rotor and heat exchanger would result from rotor displacement rather than from exchanger displacement, e.g. in which the exchanger would be stationary, or even an arrangement in which the effect from the variation of the rotating induction within the exchanger walls would be produced, rather than by relative movement of the exchanger and rotor, by interposition between both members of a movable cylindrical shield made of a magnetic material, the function of which would be to prevent the rotating induction in the zone of the thus shielded portion of the exchanger.

All such modifications are within the scope of the invention.

We claim:

1. An apparatus for heating a fluid, said apparatus comprising:
   i. a cylindrical rotor structure having an axis of symmetry, a shaft mounted for rotation about said axis of symmetry and, distributed about said axis of symmetry, means for rotating said shaft, a plurality of elongate permanent magnet means having lines of magnetization radially extending about said axis of symmetry and each having an outer elongate polar surface which extends substantially along the whole length of a generatrix of the cylindrical rotor structure with the same polarity, the respective polar surfaces of the respective magnet means alternately having opposite polarities;
   ii. a generally cylindrical heat-exchanging structure made of an electrically conducting material and coaxially mounted in a stationary angular position around said rotor structure, the lines of magnetization passing through the said heat-exchanging structure from each of said polar surfaces to the alternate polar surface;
   iii. means for passing a fluid over the heat-exchanging structure for heating the fluid;
   iv. displacing means for effecting relative displacement of the rotor structure with respect to the heat-exchanging structure in a direction parallel to the said axis of symmetry, whereby eddy currents having a variable intensity as a function of the said displacement are generated in the heat-exchanging structure and a variable resisting torque is exerted on the shaft, said apparatus further comprising: means for measuring the speed of rotation of the shaft and means, monitored by said measuring means, for controlling the displacing means as a function of the said speed of rotation.

2. An apparatus as claimed in claim 1, said apparatus further comprising: a generally cylindrical flux return path means made of a soft magnetic material, coaxially mounted about said rotor structure and forming an air gap with said rotor structure wherein the said heat-exchanging structure is arranged.

3. An apparatus as claimed in claim 2, wherein the said displacing means displaces the heat-exchanging structure and the flux returning means from a first position in which substantially all the lines of magnetization pass through the heat-exchanging structure to a second position in which substantially none of the lines of magnetization pass through the heat-exchanging structure.

4. An apparatus as claimed in claim 2, wherein the heat-exchanging structure has inner and outer generally cylindrical electrically conducting sleeves coaxially mounted about said axis of symmetry and forming a helically shaped conduit therebetween.

5. An apparatus as claimed in claim 1, wherein said controlling means provides a substantially parabolic law of variation of the said resisting torque as a function of the said speed of rotation.

* * * * *

UNITED STATES PATENT AND TRADEMARK OFFICE
CERTIFICATE OF CORRECTION

PATENT NO. : 4,486,638
DATED : December 4, 1984
INVENTOR(S) : Michel Cotton de Bennetot It is certified that error appears in the above-identified patent and that said Letters Patent are hereby corrected as shown below:

On the title page;

(73) Assignee: Le Materiel Magnetique
Puteaux, France

Signed and Sealed this

Sixteenth Day of July 1985

[SEAL]

Attest:

DONALD J. QUIGG

Attesting Officer     Acting Commissioner of Patents and Trademarks